United States Patent
Guo

(10) Patent No.: US 9,214,982 B2
(45) Date of Patent: Dec. 15, 2015

(54) ACTIVATED CODE CHANNEL DETECTION METHOD AND DEVICE

(71) Applicant: Huawei Technologies Co., Ltd., Shenzhen (CN)

(72) Inventor: Jing Guo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 51 days.

(21) Appl. No.: 13/910,723

(22) Filed: Jun. 5, 2013

(65) Prior Publication Data
US 2013/0343435 A1    Dec. 26, 2013

(30) Foreign Application Priority Data
Jun. 21, 2012 (CN) .......................... 2012 1 0207972

(51) Int. Cl.
*H04B 1/707* (2011.01)
*H04J 13/00* (2011.01)

(52) U.S. Cl.
CPC ............ *H04B 1/707* (2013.01); *H04J 13/0044* (2013.01); *H04J 13/0048* (2013.01); *H04J 13/0051* (2013.01)

(58) Field of Classification Search
CPC . H04B 1/70735; H04B 1/707; H04J 13/0044; H04J 13/0048; H04J 13/0051
USPC .......................... 375/142–143, 149–150, 340
See application file for complete search history.

(56) References Cited

U.S. PATENT DOCUMENTS 8,199,793 B2* 6/2012 Bastug .......................... 375/150
8,315,344 B2* 11/2012 Ringstrom et al. ........... 375/350

(Continued)

FOREIGN PATENT DOCUMENTS

| CN | 101136889 A | 3/2008 |
| CN | 101557262 A | 10/2009 |
| CN | 101640549 A | 2/2010 |

(Continued)

OTHER PUBLICATIONS

B. G. Mobasseri, "Digital modulation classification using constellation shape," Signal Processing, vol. 80, No. 2, pp. 251-277, 2007.

(Continued)

*Primary Examiner* — Sophia Vlahos
(74) *Attorney, Agent, or Firm* — Brinks Gilson & Lione

(57) ABSTRACT

The present invention provides an activated code channel detection method. The method includes: performing de-scrambling and de-spreading on a received signal according to a node corresponding to a current spreading factor, obtaining symbol energy corresponding to each node; acquiring a first decision parameter and a second decision parameter according to symbol energy of two adjacent nodes of a same parent node and a pre-acquired noise threshold, where the first decision parameter is a comparison result of comparing the noise threshold with symbol energy of each of the two adjacent nodes, and the second decision parameter is a comparison result of comparing the symbol energy of the two adjacent nodes; detecting modulation modes of code channels corresponding to the two adjacent nodes, obtaining a modulation mode detection result; and executing activated code channel detection according to the first decision parameter, the second decision parameter, and the modulation mode detection result.

16 Claims, 3 Drawing Sheets

(56) References Cited

U.S. PATENT DOCUMENTS

| | | | |
|---|---|---|---|
| 8,699,546 B2 * | 4/2014 | Jonsson et al. | 375/148 |
| 2010/0272155 A1 | 10/2010 | Lomp et al. | |

FOREIGN PATENT DOCUMENTS

| | | |
|---|---|---|
| CN | 101651464 A | 2/2010 |
| KR | 20040042788 A | 5/2004 |
| WO | WO 2009/107079 * | 9/2009 ............ H04L 27/00 |
| WO | WO 2009/120395 A1 | 10/2009 |
| WO | WO 2009/138946 A1 | 11/2009 |

OTHER PUBLICATIONS

Liang Hong, "Low-Complexity Identifier for M-ary QAM Signals" SOUTHEASTCON '09. IEEE, Issue Date: Mar. 5-8, 2009, pp. 164-168.

\* cited by examiner

ACTIVATED CODE CHANNEL DETECTION METHOD AND DEVICE

CROSS-REFERENCE TO RELATED APPLICATION

This application claims priority to Chinese Patent Application No. 201210207972.9, filed on Jun. 21, 2012, which is hereby incorporated by reference in its entirety.

TECHNICAL FIELD

The present invention relates to a code channel detection technology, and in particular, to an activated code channel detection method and device, belonging to the technical field of communications.

BACKGROUND

In a down-link of a CDMA system, a UE usually only knows some information of the present user, and adopts an interference suppression algorithm for other users. Because the CDMA is an interference-limited system, in order to improve system capacity, an advanced interference user suppression algorithm is developed, which requires more interference user information, such as the number of code channels occupied by each user. By detecting the number of activated code channels, whether a new user enters may be determined, and the detection may be used in user capture, a soft handover procedure, and multi-user detection.

In a code channel detection technology in the prior art, usually a received signal is de-spread according to all spreading codes in a spreading code set, that is, through a spread-spectrum matched filter, symbol energy output from the same spread-spectrum matched filter is accumulated, and when an accumulated value of a spread-spectrum matched filter is greater than a certain noise threshold, it indicates that a code channel corresponding to the spreading code is activated.

In the code channel detection technology in the prior art, only the accumulated value and the noise threshold are compared to determine whether a code channel is activated, and with the simple noise threshold decision, accuracy of detecting the activated code channel is low when noise estimation is not accurate or an interference user signal is weak.

SUMMARY

As for defects in the prior art, embodiments of the present invention provide an activated code channel detection method and device, so as to implement high accuracy activated code channel detection.

In one aspect, an embodiment of the present invention provides an activated code channel detection method, including:

performing de-scrambling and de-spreading on a received signal according to a node corresponding to a current spreading factor in a spreading code tree, and obtaining symbol energy corresponding to each node after de-scrambling and de-spreading;

acquiring a first decision parameter and a second decision parameter according to symbol energy of two adjacent nodes belonging to a same parent node and a pre-obtained noise threshold, where the first decision parameter is a comparison result of comparing the noise threshold with symbol energy of each of the two adjacent nodes, and the second decision parameter is a comparison result of comparing the symbol energy of the two adjacent nodes;

detecting modulation modes of code channels corresponding to the two adjacent nodes, and obtaining a modulation mode detection result; and executing activated code channel detection according to the first decision parameter, the second decision parameter, and the modulation mode detection result.

In one aspect, an embodiment of the present invention provides an activated code channel detection device, including:

a first processing module, configured to perform de-scrambling and de-spreading on a received signal according to a node corresponding to a current spreading factor in a spreading code tree, and obtain symbol energy corresponding to each node after de-scrambling and de-spreading;

a second processing module, configured to acquire a first decision parameter and a second decision parameter according to symbol energy of two adjacent nodes belonging to a same parent node and a pre-obtained noise threshold, where the first decision parameter is a comparison result of comparing the noise threshold with symbol energy of each of the two adjacent nodes, and the second decision parameter is a comparison result of comparing the symbol energy of the two adjacent nodes;

a third processing module, configured to detect modulation modes of code channels corresponding to the two adjacent nodes, and obtain a modulation mode detection result; and a fourth processing module, configured to execute activated code channel detection according to the first decision parameter, the second decision parameter, and the modulation mode detection result.

According to the activated code channel detection method and device in the embodiments of the present invention, not only the symbol energy corresponding to a code channel and the noise threshold are compared, to learn whether signal energy except noise exists in the code channel, but also the symbol energy of the two adjacent nodes belonging to a same parent node (that is, energy of two branch code channels belonging to the same upper-level code channel) is compared, to learn that the energy of the upper-level code channel is transferred through two branch code channels, or is transferred through only one of the branch code channels. In combination with the modulation mode detection result of the activated code channel, a reliable transfer path of the signal energy in each code channel in the spreading code tree, that is, the activated code channel, is obtained, and compared with the detecting the activated code channel only according to whether symbol energy is greater than a noise threshold, accuracy of the activated code channel detection is improved greatly, and high accuracy activated code channel detection is implemented.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

An activated code channel detection method in an embodiment of the present invention is executed by, for example, an activated code channel detection device. The activated code channel detection device may be integrally disposed in an existing network apparatus (for example, a signal receiver) in a communication network, or may be disposed in the communication network independently, to communicate with the existing network apparatus, which is not limited by the present invention.

Embodiment 1

Figure 1:
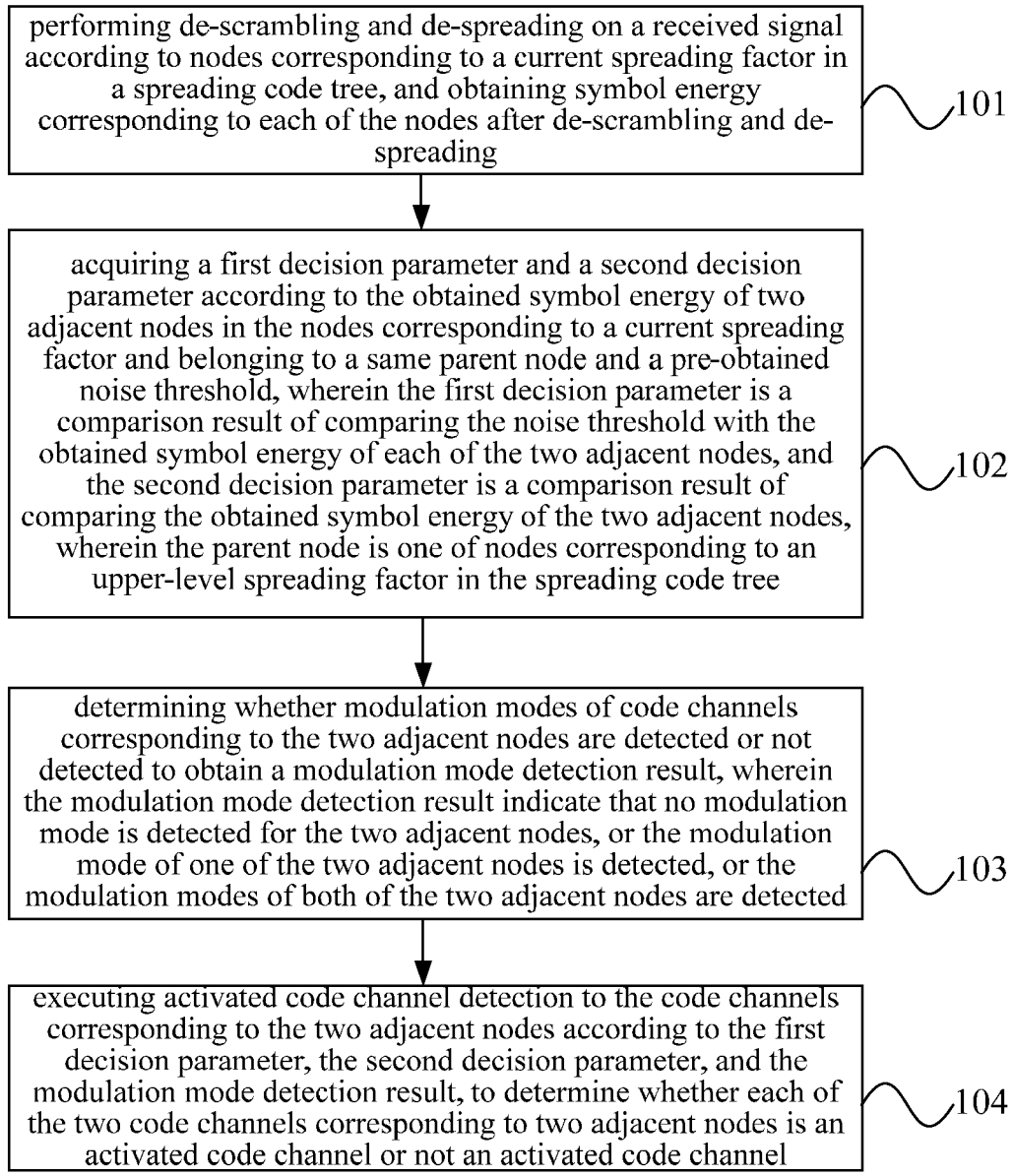
FIG. 1 is a schematic flow chart of an activated code channel detection method in an embodiment of the present invention.

FIG. 1 is a schematic flow chart of an activated code channel detection method in an embodiment of the present invention. As shown in FIG. 1, the activated code channel detection method includes:

101: Perform de-scrambling and de-spreading on a received signal according to a node corresponding to a current spreading factor in a spreading code tree, and obtain symbol energy corresponding to each node after de-scrambling and de-spreading;

102: Acquire a first decision parameter and a second decision parameter according to symbol energy of two adjacent nodes belonging to a same parent node and a pre-obtained noise threshold, where the first decision parameter is a comparison result of comparing the noise threshold with symbol energy of each of the two adjacent nodes, and the second decision parameter is a comparison result of comparing the symbol energy of the two adjacent nodes;

103: Detect modulation modes of code channels corresponding to the two adjacent nodes, and obtain a modulation mode detection result; and

104: Execute activated code channel detection according to the first decision parameter, the second decision parameter, and the modulation mode detection result.

Figure 2:
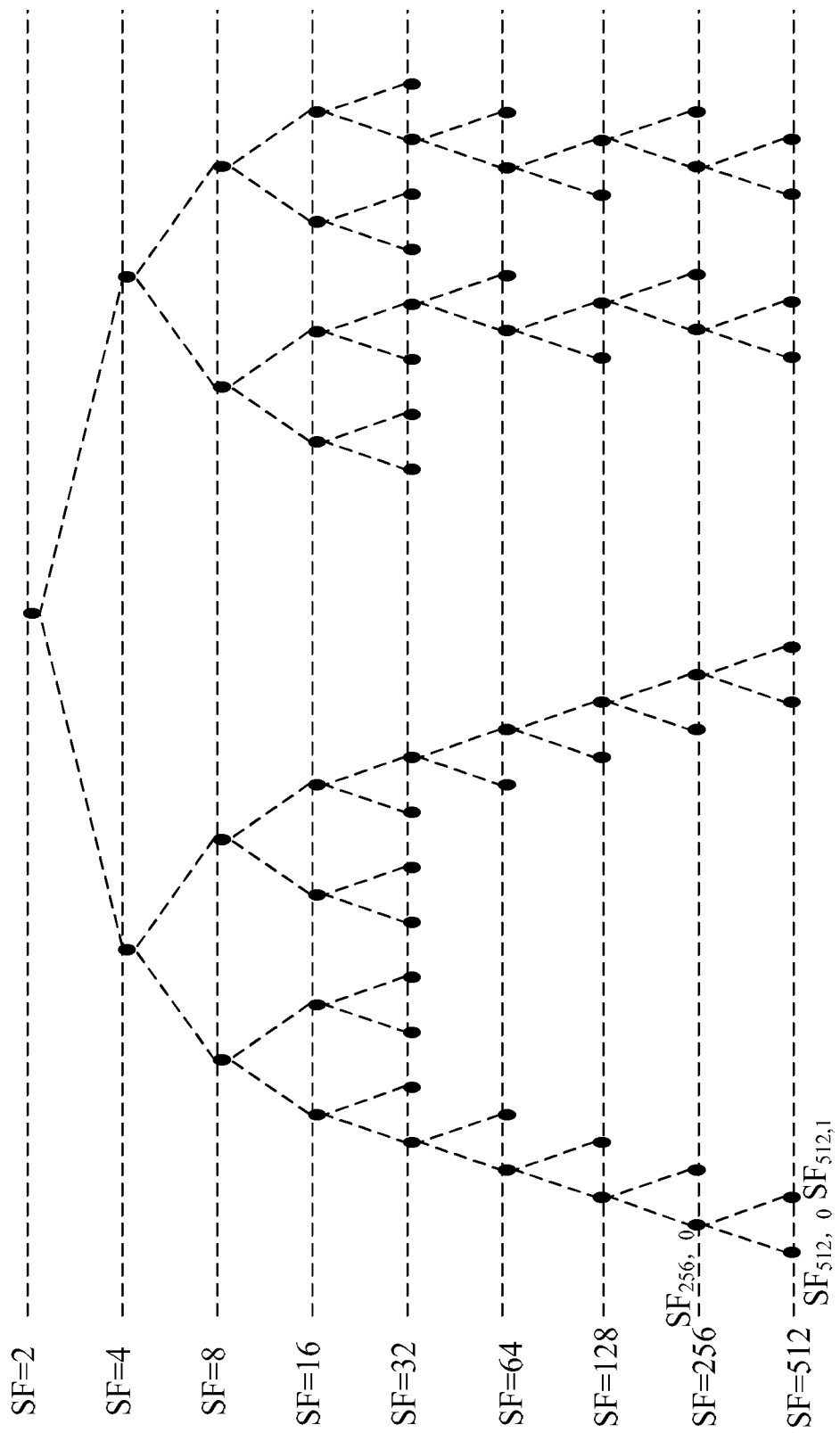
FIG. 2 is a schematic structural diagram of a spreading code tree in the present invention.

Specifically, FIG. 2 is a schematic structural diagram of a spreading code tree in the present invention. The activated code channel detection method in this embodiment is illustrated in detail with reference to FIG. 2 in the following.

As shown in FIG. 2, the spreading code tree includes, for example, nodes (for example: $SF_{512, 0}$) corresponding to a spreading factor SF=N (N=512, 256, 128, 64, 32, 16, 8, 4, 2), and code channels corresponding to each node. The number of nodes corresponding to the spreading factor SF=512 is 512, that is, $SF_{512, 0}$ to $SF_{512, 511}$, and the number of nodes corresponding to the spreading factor SF=256 is 256, that is, $SF_{256, 0}$ to $SF_{256, 255}$. Similarly, the number of nodes corresponding to the spreading factor SF=N is N. In multiple nodes corresponding to each spreading factor, two adjacent nodes $SF_{N, 2n}$ and $SF_{N, 2n+1}$ belong to a node $SF_{N-1, n}$ corresponding to an upper-level spreading factor, where if N=512, N−1 indicates an upper-level spreading factor of 512, that is, N−1=256, and $0 \leq n \leq (N/2)-1$. For example, $SF_{512, 0}$ and $SF_{512, 1}$ belong to $SF_{256, 0}$, $SF_{512, 0}$ and $SF_{512, 1}$ are referred to as two adjacent nodes belonging to the same parent node in the following, and $SF_{256, 0}$ is the parent node to which $SF_{512, 0}$ and $SF_{512, 1}$ belong.

When a signal is input into an activated code channel detection device, the activated code channel detection device may receive each input signal, perform de-scrambling and de-spreading on a received signal with any de-scrambling and de-spreading method in the prior art, and obtain a symbol and corresponding symbol energy obtained by de-scrambling and de-spreading each received signal. The activated code channel detection device detects whether code channels corresponding to each node are activated code channels level by level, based on the spreading code tree shown in FIG. 2 and according to symbol energy of nodes corresponding to each-level spreading factor and a pre-obtained noise threshold. The noise threshold may be obtained through any noise estimation method in the prior art.

For example, nodes corresponding to the spreading factor SF=512 are processed at first, and 512 nodes corresponding to SF=512 are divided into 256 groups of nodes, where each group of nodes includes two adjacent nodes belonging to the same parent node. Symbol energy of each of the two adjacent nodes included in each group of nodes is compared with the noise threshold, and the magnitude between the symbol energy of the each of the two adjacent nodes and the noise threshold is obtained through comparison (that is, a first decision parameter), and the symbol energy of the two adjacent nodes is compared, so as to determine whether the symbol energy of the two adjacent nodes is close to each other or has a large difference (that is, a second decision parameter). In addition, modulation modes of code channels corresponding to the two adjacent nodes need to be detected, so as to learn whether a corresponding modulation mode is detected (that is, a modulation mode detection result). An example that two adjacent nodes in a group of nodes are node A and node B is taken, the first decision parameter includes a result of comparing the noise threshold and symbol energy of node A, and a result of comparing the noise threshold and symbol energy of node B. The second decision parameter includes a result of comparing the symbol energy of node A and the symbol energy of node B, for example, a difference between the symbol energy of node A and the symbol energy of node B. The modulation mode detection result includes a modulation mode detection result of node A and a modulation mode detection result of node B.

Afterwards, according to the first decision parameter, the second decision parameter, and the modulation mode detection result, whether two code channels corresponding to two adjacent nodes included in each group of nodes are activated code channels is determined. Based on the foregoing manner, a group of nodes corresponding to each spreading factor are detected repeatedly so as to determine all activated code channels.

According to the activated code channel detection method in this embodiment, not only symbol energy corresponding to a code channel and a noise threshold are compared, so as to learn whether signal energy except noise exists in the code channel, but also symbol energy of two adjacent nodes belonging to a same parent node (that is, energy of two branch code channels belonging to the same upper-level code channel) is compared, so as to learn that the energy of the upper-level code channel is transferred through two branch code channels, or is transferred through only one of the branch code channels. In combination with the modulation mode detection result of an activated code channel, a reliable transfer path of signal energy in each code channel in a spreading code tree, that is, the activated code channel, is obtained, and compared with the detecting an activated code channel only according to whether symbol energy is greater than a noise threshold, accuracy of activated code channel detection is improved greatly, and high accuracy activated code channel detection is implemented.

Embodiment 2

On the basis of Embodiment 1, executing activated code channel detection according to the first decision parameter, the second decision parameter, and the modulation mode detection result is illustrated in detail.

Specifically, executing activated code channel detection according to the first decision parameter, the second decision parameter, and the modulation mode detection result specifically includes:

detecting whether code channels corresponding to the two adjacent nodes are activated code channels according to the first decision parameter, the second decision parameter, and the modulation mode detection result, and determining whether a parent node to which the two adjacent nodes belong exists; and if the parent node to which the two adjacent nodes belong exists, updating a spreading factor corresponding to the parent node as the current spreading factor, and returning to the step of performing de-scrambling and de-spreading on a received signal according to the node corresponding to the current spreading factor in the spreading code tree.

More specifically, detecting whether the code channels corresponding to the two adjacent nodes are activated code channels according to the first decision parameter, the second decision parameter, and the modulation mode detection result, and determining whether the parent node to which the two adjacent nodes belong exists specifically includes:

if symbol energy of each of the two adjacent nodes is smaller than or equal to a noise threshold, determining that the code channels corresponding to the two adjacent nodes are non-activated code channels, and determining that the parent node to which the two adjacent nodes belong does not exist;

if the symbol energy of one of the two adjacent nodes is greater than the noise threshold, determining that a code channel corresponding to the node whose symbol energy is greater than the noise threshold is an activated code channel, and determining that the parent node to which the two adjacent nodes belong does not exist;

if symbol energy of each of the two adjacent nodes is greater than the noise threshold, and a difference between the symbol energy of the two adjacent nodes is greater than a preset value, determining that the code channels corresponding to the two adjacent nodes are activated code channels, and determining that the parent node to which the two adjacent nodes belong does not exist;

if symbol energy of each of the two adjacent nodes is greater than the noise threshold, the difference between the symbol energy of the two adjacent nodes is smaller than or equal to the preset value, and the modulation mode detection result is that the modulation modes of the two adjacent nodes are not detected, determining that the code channels corresponding to the two adjacent nodes are non-activated code channels, and determining that the parent node to which the two adjacent nodes belong exists; and if symbol energy of each of the two adjacent nodes is greater than the noise threshold, a difference between the symbol energy of the two adjacent nodes is smaller than or equal to the preset value, and the modulation mode detection result is that a modulation mode of at least one node in the two adjacent nodes is detected, determining that the code channels corresponding to the two adjacent nodes are activated code channels, and determining that the parent node to which the two adjacent nodes belong exists.

An example that the activated code channel detection is executed on a group of nodes including $SF_{512,0}$ and $SF_{512,1}$ is taken to illustrate the foregoing process. The first decision parameter obtained by comparing the noise threshold with each of $SF_{512,0}$ and $SF_{512,1}$ includes the following three cases: one is that the symbol energy of $SF_{512,0}$ and the symbol energy of $SF_{512,1}$ are both greater than the noise threshold; another is that the symbol energy of $SF_{512,0}$ and the symbol energy of $SF_{512,1}$ are both smaller than or equal to the noise threshold; still another is that the symbol energy of one of $SF_{512,0}$ and $SF_{512,1}$ is greater than the noise threshold, and in this case, an example that the symbol energy of $SF_{512,1}$ is greater than the noise threshold is taken in the following. The second decision parameter obtained by comparing the symbol energy of the two adjacent nodes includes the following two cases: one is that the symbol energy of $SF_{512,0}$ and the symbol energy of $SF_{512,1}$ are close to each other (for example, a difference between the two is smaller than a predetermined value or a ratio of the two is smaller than a predetermined value), the other one is that the difference between the symbol energy of $SF_{512,0}$ and the symbol energy of $SF_{512,1}$ is large (for example, the difference between the two is greater than or equal to a predetermined value or a ratio of the two is greater than or equal to a predetermined value). The modulation mode detection result includes the following three cases, one is that no modulation mode is detected for the two; another is that the modulation mode of one of the two can be detected; still another is that the modulation modes of both of the two can be detected.

According to combinations of the first decision parameter, the second decision parameter and the modulation mode detection result in different cases, activated code channel detection is performed as follows:

Case 1: The symbol energy of $SF_{512,0}$ and the symbol energy of $SF_{512,1}$ are both smaller than or equal to the noise threshold, it is determined that code channels corresponding to $SF_{512,0}$ and $SF_{512,1}$ are not activated, and it is considered that $SF_{256,0}$ does not exist.

Case 2: Only the symbol energy of $SF_{512,1}$ (or $SF_{512,0}$) is greater than the noise threshold, it is determined that a code channel corresponding to $SF_{512,1}$ is an activated code channel, and it is considered that $SF_{256,0}$ does not exist;

Case 3: The symbol energy of $SF_{512,0}$ and the symbol energy of $SF_{512,1}$ are both greater than the noise threshold, and a difference between the energy of the two is large, it is determined that code channels corresponding to $SF_{512,0}$ and $SF_{512,1}$ are activated code channels, and it is considered that $SF_{256,0}$ does not exist.

Case 4: The symbol energy of $SF_{512,0}$ and the symbol energy of $SF_{512,1}$ are both greater than the noise threshold, the energy of the two is close to each other, but the modulation mode detection result is that no modulation mode is detected for the two, it is determined that code channels corresponding to $SF_{512,0}$ and $SF_{512,1}$ are not activated, and it is considered that $SF_{256,0}$ exists.

Case 5: The symbol energy of $SF_{512,0}$ and the symbol energy of $SF_{512,1}$ are both greater than the noise threshold, the energy of the two is close to each other, and the modulation mode detection result is that the modulation mode of one of the two can be detected or the modulation modes of both of the two can be detected, it is determined that code channels corresponding to $SF_{512,0}$ and $SF_{512,1}$ are activated code channels, and it is considered that $SF_{256,0}$ exists.

256 groups of nodes corresponding to the spreading factor SF=512 in the spreading code tree are determined based on the foregoing five cases, and then all activated code channels corresponding to the spreading factor SF=512 are obtained. Further, according to the existence condition of each node corresponding to the spreading factor SF=256 obtained through determining based on the foregoing five cases, 128 groups of nodes corresponding to the spreading factor SF=512 are determined based on the foregoing five cases. In the determining process, for the 128 groups of nodes, only when each group of nodes at least includes one node which is determined to be in existence, it needs to determine which one of case 1 to case 5 does the group of nodes belong to. If two adjacent nodes in a group of nodes are determined to be not in existence, it is unnecessary to process the group of nodes, it is considered that a parent node to which the group of nodes belongs does not exist, and backtracking of a branch corresponding to the group of nodes in the spreading code tree stops. Based on this backtracking manner, backtracking from SF=512 to SF-256, from SF=256 to SF=128, from SF=128 to SF=64, from SF=64 to SF=32, from SF=32 to SF=16, from SF=16 to SF=8, from SF=8 to SF=4, and from SF=4 to SF=2 in the spreading code tree is implemented, to detect all activated code channels corresponding to each spreading factor.

According to the activated code channel detection method in this embodiment, code channels of all different spreading factors are traversed, whether a code channel is activated is decided jointly according to conditions such as the magnitude between symbol energy corresponding to a code channel of a spreading factor and the noise threshold, the difference between symbol energy of two branch code channels acting as code channels of the same spreading factor, and whether the modulation mode of a code channel is detected, a reliable activated code channel detection result is obtained, thereby ensuring detection performance and throughput performance in a mixed code channel scenario.

Further, in the activated code channel detection method in the foregoing embodiment, detecting whether the code channels corresponding to the two adjacent nodes are activated code channels according to the first decision parameter, the second decision parameter, and the modulation mode detection result specifically includes:

determining whether the code channels corresponding to the two adjacent nodes are specific code channels; if yes, determining that the code channels corresponding to the two adjacent nodes are activated code channels; if not, detecting whether the code channels corresponding to the two adjacent nodes are activated code channels according to the first decision parameter, the second decision parameter, and the modulation mode detection result.

According to the activated code channel detection method in this embodiment, because specific code channels with known code channel numbers, such as CPICH, PCCPCH and PICH, are activated inevitably during communication, code channels determined as the specific code channels are determined as the activated code channel directly without detecting, thereby reducing workload of activated code channel detection, and improving detection efficiency.

Further, the activated code channel detection method in the foregoing embodiment further includes:

if the modulation mode detection result corresponding to an activated code channel is that a modulation mode is detected, performing soft reconstruction on the activated code channel;

if the modulation mode detection result corresponding to an activated code channel is that no modulation mode is detected, performing blind reconstruction on the activated code channel.

According to the activated code channel detection method in this embodiment, for the activated code channel obtained through detection, if the modulation mode of the activated code channel is not detected, blind reconstruction is performed on the activated code channel in a subsequent reconstruction process of the activated code channel; if the modulation mode of the activated code channel is detected, soft reconstruction is performed on the activated code channel in the subsequent reconstruction process of the activated code channel, so as to obtain better reconstruction effect, thereby improving higher accuracy of interference signal reconstruction, and further improving the performance of a communication system.

Embodiment 3

Figure 3:
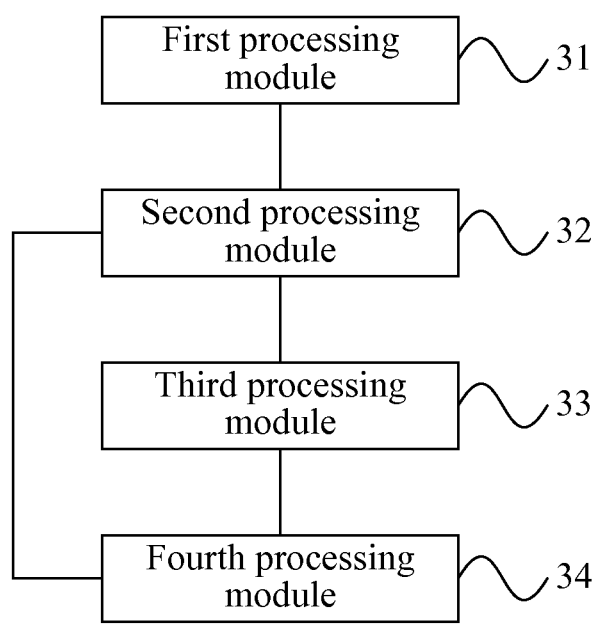
FIG. 3 is a schematic structural diagram of an activated code channel detection device in an embodiment of the present invention.

FIG. 3 is a schematic structural diagram of an activated code channel detection device in an embodiment of the present invention. As shown in FIG. 3, the activated code channel detection device includes:

a first processing module 31, configured to perform de-scrambling and de-spreading on a received signal according to a node corresponding to a current spreading factor in a spreading code tree, and obtain symbol energy corresponding to each node after de-scrambling and de-spreading;

a second processing module 32, configured to acquire a first decision parameter and a second decision parameter according to symbol energy of two adjacent nodes belonging to a same parent node and a pre-obtained noise threshold, where the first decision parameter is a comparison result of comparing the noise threshold with symbol energy of each of the two adjacent nodes, and the second decision parameter is a comparison result of comparing the symbol energy of the two adjacent nodes;

a third processing module 33, configured to detect modulation modes of code channels corresponding to the two adjacent nodes, and obtain a modulation mode detection result; and a fourth processing module 34, configured to execute activated code channel detection according to the first decision parameter, the second decision parameter, and the modulation mode detection result.

The specific process that the activated code channel detection device in this embodiment executes the activated code channel detection is the same as the activated code channel detection method in the foregoing embodiment, and details are not repeated herein again.

According to the activated code channel detection device in this embodiment, not only symbol energy corresponding to a code channel and a noise threshold are compared, to learn whether signal energy except noise exists in the code channel, but also symbol energy of two adjacent nodes belonging to a same parent node (that is, energy of two branch code channels belonging to the same upper-level code channel) is compared, so as to learn that the energy of the upper-level code channel is transferred through two branch code channels, or is transferred through only one of the branch code channels. In combination with the modulation mode detection result of an activated code channel, a reliable transfer path of signal energy in each code channel in a spreading code tree, that is, an activated code channel, is obtained, and compared with the detecting the activated code channel only according to whether the symbol energy is greater than the noise threshold, accuracy of activated code channel detection is improved greatly, and high accuracy activated code channel detection is implemented.

Further, the fourth processing module is specifically configured to:

detect whether the code channels corresponding to the two adjacent nodes are activated code channels according to the first decision parameter, the second decision parameter, and the modulation mode detection result, and determine whether the parent node to which the two adjacent nodes belong exists; and if the parent node to which the two adjacent nodes belong exists, update a spreading factor corresponding to the parent node as the current spreading factor, and return to the step of performing de-scrambling and de-spreading, by the first processing module, on the received signal according to the node corresponding to the current spreading factor in the spreading code tree.

Further, the fourth processing module is specifically configured to:

if symbol energy of each of the two adjacent nodes is smaller than or equal to the noise threshold, determine that the code channels corresponding to the two adjacent nodes are non-activated code channels, and determine that the parent node to which the two adjacent nodes belong does not exist;

if symbol energy of any node of the two adjacent nodes is greater than the noise threshold, determine that a code channel corresponding to the node whose symbol energy is greater than the noise threshold is an activated code channel, and determine that the parent node to which the two adjacent nodes belong does not exist;

if symbol energy of each of the two adjacent nodes is greater than the noise threshold, and a difference between the symbol energy of the two adjacent nodes is greater than a preset value, determine that the code channels corresponding to the two adjacent nodes are activated code channels, and determine that the parent node to which the two adjacent nodes belong does not exist;

if symbol energy of each of the two adjacent nodes is greater than the noise threshold, a difference between the symbol energy of the two adjacent nodes is smaller than or equal to the preset value, and the modulation mode detection result is that the modulation modes of the two adjacent nodes are not detected, determine that the code channels corresponding to the two adjacent nodes are non-activated code channels, and determine that the parent node to which the two adjacent nodes belong exists;

if symbol energy of each of the two adjacent nodes is greater than the noise threshold, a difference between the symbol energy of the two adjacent nodes is smaller than or equal to the preset value, and the modulation mode detection result is that a modulation mode of at least one node in the two adjacent nodes is detected, determine that the code channels corresponding to the two adjacent nodes are activated code channels, and determine that the parent node to which the two adjacent nodes belong exists.

Further, the fourth processing module is specifically configured to:

determine whether the code channels corresponding to the two adjacent nodes are specific code channels; if yes, determine that the code channels corresponding to the two adjacent nodes are activated code channels; if not, detect whether the code channels corresponding to the two adjacent nodes are activated code channels according to the first decision parameter, the second decision parameter, and the modulation mode detection result.

Further, the device further includes:

a fifth processing module, configured to, if a modulation mode detection result corresponding to an activated code channel is that a modulation mode is detected, perform soft reconstruction on the activated code channel; if a modulation mode detection result corresponding to an activated code channel is that no modulation mode is detected, perform blind reconstruction on the activated code channel.

Persons of ordinary skill in the art should understand that, all or part of the steps of the foregoing method embodiments may be implemented by a program instructing relevant hardware. The foregoing program may be stored in a computer readable storage medium. When the program is run, the foregoing steps included in the method embodiments are performed. The foregoing storage medium may be any medium capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; without departing from the idea and scope of the technical solutions of the embodiments of the present invention.

What is claimed is:

1. An activated code channel detection method, comprising:

performing de-scrambling and de-spreading on a received signal according to nodes corresponding to a current spreading factor in a spreading code tree, and obtaining symbol energy corresponding to each of the nodes after de-scrambling and de-spreading;

acquiring a first decision parameter and a second decision parameter according to the obtained symbol energy of two adjacent nodes in the nodes corresponding to a current spreading factor and belonging to a same parent node and a pre-obtained noise threshold, wherein the first decision parameter is a comparison result of comparing the noise threshold with the obtained symbol energy of each of the two adjacent nodes, and the second decision parameter is a comparison result of comparing the obtained symbol energy of the two adjacent nodes, wherein the parent node is one of nodes corresponding to an upper-level spreading factor in the spreading code tree;

determining whether modulation modes of code channels corresponding to the two adjacent nodes are detected or not detected to obtain a modulation mode detection result, wherein the modulation mode detection result indicated that no modulation mode is detected for the two adjacent nodes, or the modulation mode of one of the two adjacent nodes is detected, or the modulation modes of both of the two adjacent nodes are detected; and executing activated code channel detection to the code channels corresponding to the two adjacent nodes according to the first decision parameter, the second decision parameter, and the modulation mode detection result, to determine whether each of the two code channels corresponding to two adjacent nodes is an activated code channel or not an activated code channel.

2. The activated code channel detection method according to claim 1, wherein the executing the activated code channel detection to the code channels corresponding to the two adjacent nodes according to the first decision parameter, the second decision parameter, and the modulation mode detection result specifically comprises:

detecting whether the code channels corresponding to the two adjacent nodes are activated code channels according to the first decision parameter, the second decision parameter, and the modulation mode detection result, and determining whether the parent node to which the two adjacent nodes belong exists; and if the parent node to which the two adjacent nodes belong exists, updating a spreading factor corresponding to the parent node as the current spreading factor, and returning to the step of performing de-scrambling and de-spreading on the received signal according to the node corresponding to the current spreading factor in the spreading code tree.

3. The activated code channel detection method according to claim 2, wherein the detecting whether the code channels corresponding to the two adjacent nodes are activated code channels according to the first decision parameter, the second decision parameter, and the modulation mode detection result, and determining whether the parent node to which the two adjacent nodes belong exists specifically comprises:

if the obtained symbol energy of each of the two adjacent nodes is smaller than or equal to the noise threshold, determining that the code channels corresponding to the two adjacent nodes are non-activated code channels, and determining that the parent node to which the two adjacent nodes belong does not exist;

if the obtained symbol energy of any node of the two adjacent nodes is greater than the noise threshold, determining that a code channel corresponding to the node whose symbol energy is greater than the noise threshold is an activated code channel, and determining that the parent node to which the two adjacent nodes belong does not exist;

if the obtained symbol energy of each of the two adjacent nodes is greater than the noise threshold, and a difference between the obtained symbol energy of the two adjacent nodes is greater than a preset value, determining that the code channels corresponding to the two adjacent nodes are activated code channels, and determining that the parent node to which the two adjacent nodes belong does not exist;

if the obtained symbol energy of each of the two adjacent nodes is greater than the noise threshold, a difference between the obtained symbol energy of the two adjacent nodes is smaller than or equal to the preset value, and the modulation mode detection result is that the modulation modes of the two adjacent nodes are not detected, determining that the code channels corresponding to the two adjacent nodes are non-activated code channels, and determining that the parent node to which the two adjacent nodes belong exists;

if the obtained symbol energy of each of the two adjacent nodes is greater than the noise threshold, a difference between the obtained symbol energy of the two adjacent nodes is smaller than or equal to the preset value, and the modulation mode detection result is that a modulation mode of at least one node in the two adjacent nodes is detected, determining that the code channels corresponding to the two adjacent nodes are activated code channels, and determining that the parent node to which the two adjacent nodes belong exists.

4. The activated code channel detection method according to claim 2, wherein the detecting whether the code channels corresponding to the two adjacent nodes are activated code channels according to the first decision parameter, the second decision parameter, and the modulation mode detection result specifically comprises:

determining whether the code channels corresponding to the two adjacent nodes are specific code channels; if yes, determining that the code channels corresponding to the two adjacent nodes are activated code channels; if not, detecting whether the code channels corresponding to the two adjacent nodes are activated code channels according to the first decision parameter, the second decision parameter, and the modulation mode detection result.

5. The activated code channel detection method according to 1, if one of the two code channels corresponding to two adjacent nodes is an activated code channel, after the executing the activated code channel detection to the code channels corresponding to the two adjacent nodes, further comprising:

if the modulation mode detection result corresponding to the activated code channel is that the modulation mode is detected, performing soft reconstruction on the activated code channel;

if the modulation mode detection result corresponding to the activated code channel is that no modulation mode is detected, performing blind reconstruction on the activated code channel.

6. An activated code channel detection device, comprising: a processor and memory storing instructions that are executed on the processor such that:

a first processing module performs de-scrambling and de-spreading on a received signal according to nodes corresponding to a current spreading factor in a spreading code tree, and obtains symbol energy corresponding to each of the nodes after de-scrambling and de-spreading;

a second processing module acquires a first decision parameter and a second decision parameter according to the obtained symbol energy of two adjacent nodes in the nodes corresponding to a current spreading factor and belonging to a same parent node and a pre-obtained noise threshold, wherein the first decision parameter is a comparison result of comparing the noise threshold with the obtained symbol energy of each of the two adjacent nodes, and the second decision parameter is a comparison result of comparing the obtained symbol energy of the two adjacent nodes, wherein the parent node is one of nodes corresponding to an upper-level spreading factor in the spreading code tree;

a third processing module determines whether modulation modes of code channels corresponding to the two adjacent nodes are detected or not detected to obtains a modulation mode detection result, wherein the modulation mode detection result indicated that no modulation mode is detected for the two adjacent nodes, or the modulation mode of one of the two adjacent nodes is detected, or the modulation modes of both of the two adjacent nodes are detected; and a fourth processing module executes activated code channel detection to the code channels corresponding to the two adjacent nodes according to the first decision parameter, the second decision parameter, and the modulation mode detection result, to determine whether each of the two code channels corresponding to two adjacent nodes is an activated code channel or not an activated code channel.

7. The activated code channel detection device according to claim 6, wherein the fourth processing module specifically detects whether the code channels corresponding to the two adjacent nodes are activated code channels according to the first decision parameter, the second decision parameter, and the modulation mode detection result, and determines whether the parent node to which the two adjacent nodes belong exists; and if the parent node to which the two adjacent nodes belong exists, updates a spreading factor corresponding to the parent node as the current spreading factor, and returns to the step of performing de-scrambling and de-spreading, by the first processing module, on the received signal according to the node corresponding to the current spreading factor in the spreading code tree.

8. The activated code channel detection device according to claim 7, wherein:

if the obtained symbol energy of each of the two adjacent nodes is smaller than or equal to the noise threshold, the fourth processing module determines that the code channels corresponding to the two adjacent nodes are non-activated code channels, and determine that the parent node to which the two adjacent nodes belong does not exist;

if the obtained symbol energy of any node of the two adjacent nodes is greater than the noise threshold, the fourth processing module determines that a code channel corresponding to the node whose symbol energy is greater than the noise threshold is an activated code channel, and determine that the parent node to which the two adjacent nodes belong does not exist;

if the obtained symbol energy of each of the two adjacent nodes is greater than the noise threshold, and a difference between the obtained symbol energy of the two adjacent nodes is greater than a preset value, the fourth processing module determines that the code channels corresponding to the two adjacent nodes are activated code channels, and determine that the parent node to which the two adjacent nodes belong does not exist;

if the obtained symbol energy of each of the two adjacent nodes is greater than the noise threshold, a difference between the obtained symbol energy of the two adjacent nodes is smaller than or equal to the preset value, and the modulation mode detection result is that the modulation modes of the two adjacent nodes are not detected, the fourth processing module determines that the code channels corresponding to the two adjacent nodes are non-activated code channels, and determine that the parent node to which the two adjacent nodes belong exists;

if the obtained symbol energy of each of the two adjacent nodes is greater than the noise threshold, a difference between the obtained symbol energy of the two adjacent nodes is smaller than or equal to the preset value, and the modulation mode detection result is that a modulation mode of at least one node in the two adjacent nodes is detected, the fourth processing module determines that the code channels corresponding to the two adjacent nodes are activated code channels, and determine that the parent node to which the two adjacent nodes belong exists.

9. The activated code channel detection device according to claim 7, wherein the fourth processing module determines whether the code channels corresponding to the two adjacent nodes are specific code channels; if the code channels corresponding to the two adjacent nodes are specific code channels, determines that the code channels corresponding to the two adjacent nodes are activated code channels; if the code channels corresponding to the two adjacent nodes aren't specific code channels, detects whether the code channels corresponding to the two adjacent nodes are activated code channels according to the first decision parameter, the second decision parameter, and the modulation mode detection result.

10. The activated code channel detection device according to claim 6, the activated code channel detection device further comprising: a fifth processing module;

if the fourth processing module determines one of the two code channels corresponding to two adjacent nodes is an activated code channel, the fifth processing module performs soft reconstruction on the activated code channel if the modulation mode detection result corresponding to the activated code channel is that the modulation mode is detected;

the fifth processing module performs blind reconstruction on the activated code channel if the modulation mode detection result corresponding to the activated code channel is that no modulation mode is detected.

11. The activated code channel detection method according to claim 2, if one of the two code channels corresponding to two adjacent nodes is an activated code channel, after the executing the activated code channel detection to the code channels corresponding to the two adjacent nodes, further comprising:

if the modulation mode detection result corresponding to the activated code channel is that the modulation mode is detected, performing soft reconstruction on the activated code channel;

if the modulation mode detection result corresponding to the activated code channel is that no modulation mode is detected, performing blind reconstruction on the activated code channel.

12. The activated code channel detection method according to claim 3, if one of the two code channels corresponding to two adjacent nodes is an activated code channel, after the executing the activated code channel detection to the code channels corresponding to the two adjacent nodes, further comprising:

if the modulation mode detection result corresponding to the activated code channel is that the modulation mode is detected, performing soft reconstruction on the activated code channel;

if the modulation mode detection result corresponding to the activated code channel is that no modulation mode is detected, performing blind reconstruction on the activated code channel.

13. The activated code channel detection method according to claim 4, if one of the two code channels corresponding to two adjacent nodes is an activated code channel, after the executing the activated code channel detection to the code channels corresponding to the two adjacent nodes, further comprising:

if the modulation mode detection result corresponding to the activated code channel is that the modulation mode is detected, performing soft reconstruction on the activated code channel;

if the modulation mode detection result corresponding to the activated code channel is that no modulation mode is detected, performing blind reconstruction on the activated code channel.

14. The activated code channel detection device according to claim 7, the activated code channel detection device further comprising: a fifth processing module;

if the fourth processing module determines one of the two code channels corresponding to two adjacent nodes is an activated code channel, the fifth processing module performs soft reconstruction on the activated code channel if the modulation mode detection result corresponding to the activated code channel is that the modulation mode is detected;

the fifth processing module performs blind reconstruction on the activated code channel if the modulation mode detection result corresponding to the activated code channel is that no modulation mode is detected.

15. The activated code channel detection device according to claim 8, the activated code channel detection device further comprising: a fifth processing module;

if the fourth processing module determines one of the two code channels corresponding to two adjacent nodes is an activated code channel, the fifth processing module performs soft reconstruction on the activated code channel if the modulation mode detection result corresponding to the activated code channel is that the modulation mode is detected;

the fifth processing module performs blind reconstruction on the activated code channel if the modulation mode detection result corresponding to the activated code channel is that no modulation mode is detected.

16. The activated code channel detection device according to claim 9, the activated code channel detection device further comprising: a fifth processing module;

if the fourth processing module determines one of the two code channels corresponding to two adjacent nodes is an activated code channel, the fifth processing module performs soft reconstruction on the activated code channel if the modulation mode detection result corresponding to the activated code channel is that the modulation mode is detected;

the fifth processing module performs blind reconstruction on the activated code channel if the modulation mode detection result corresponding to the activated code channel is that no modulation mode is detected.

* * * * *